(12) United States Patent
Shang et al.

(10) Patent No.: US 12,236,620 B2
(45) Date of Patent: Feb. 25, 2025

(54) THREE-DIMENSIONAL RECONSTRUCTION METHOD AND APPARATUS

(71) Applicant: GOERTEK INC., Shandong (CN)

(72) Inventors: Jiale Shang, Shandong (CN); Bin Jiang, Shandong (CN); Xiaoyu Chi, Shandong (CN)

(73) Assignee: GOERTEK INC., Shandong (CN)

( * ) Notice: Subject to any disclaimer, the term of this patent is extended or adjusted under 35 U.S.C. 154(b) by 121 days.

(21) Appl. No.: 18/004,847

(22) PCT Filed: Nov. 7, 2020

(86) PCT No.: PCT/CN2020/127362
§ 371 (c)(1),
(2) Date: Jan. 9, 2023

(87) PCT Pub. No.: WO2022/011898
PCT Pub. Date: Jan. 20, 2022

(65) Prior Publication Data
US 2023/0306619 A1 Sep. 28, 2023

(30) Foreign Application Priority Data

Jul. 17, 2020 (CN) .......................... 202010692404.7

(51) Int. Cl.
*G06T 7/33* (2017.01)
*G06T 7/246* (2017.01)
(Continued)

(52) U.S. Cl.
CPC ................ *G06T 7/33* (2017.01); *G06T 7/246* (2017.01); *G06T 7/50* (2017.01); *G06T 19/20* (2013.01);
(Continued)

(58) Field of Classification Search
CPC . G06T 2207/10016; G06T 2207/20072; G06T 7/246; G06T 7/33; G06T 7/50; G06T 19/20
(Continued)

(56) References Cited

U.S. PATENT DOCUMENTS

| 2009/0274265 | A1 | 11/2009 | Koehler et al. | |
| 2016/0379335 | A1* | 12/2016 | Kwon | G06T 1/20 |
| | | | | 345/506 |
| 2018/0295375 | A1* | 10/2018 | Ratner | G06T 7/12 |

FOREIGN PATENT DOCUMENTS

| CN | 109308737 A | 2/2019 |
| CN | 109493417 A | 3/2019 |

(Continued)

*Primary Examiner* — Kenny A Cese
(74) *Attorney, Agent, or Firm* — LKGlobal | Lorenz & Kopf, LLP

(57) ABSTRACT

A three-dimensional reconstruction method, comprising: performing slide calculation on an acquired current image frame to obtain to-be-processed windows; performing point feature extraction and line feature extraction on the to-be-processed windows, and determining corresponding features in each to-be-processed window; performing iterative quadtree splitting for circles on each target to-be-processed window to obtain circular regions of interest corresponding to each target to-be-processed window; performing feature screening on features in the target circular regions of interest to obtain target features corresponding to each target circular region of interest; and performing three-dimensional reconstruction corresponding to the current image frame by using the target features. By introducing line features in the feature extraction stage of three-dimensional reconstruction, the line segment features in the three-dimensional reconstruction scenes can be better perceived, and the reconstruction efficiency of simple regular three-dimensional models can be accelerated.

14 Claims, 8 Drawing Sheets

(51) Int. Cl.
*G06T 7/50* (2017.01)
*G06T 19/20* (2011.01)

(52) U.S. Cl.
CPC ............... *G06T 2207/10016* (2013.01); *G06T 2207/20072* (2013.01)

(58) Field of Classification Search
USPC ........................................................ 382/100
See application file for complete search history.

(56) References Cited

FOREIGN PATENT DOCUMENTS

| | | | |
|---|---|---|---|
| CN | 110044354 A | 7/2019 |
| CN | 111126436 A | 5/2020 |
| CN | 111862343 A | 10/2020 |
| KR | 20100097886 A | 9/2010 |

\* cited by examiner

THREE-DIMENSIONAL RECONSTRUCTION METHOD AND APPARATUS

CROSS-REFERENCE TO RELATED APPLICATIONS

This application is a U.S. National-Stage entry under 35 U.S.C. § 371 based on International Application No. PCT/CN2020/127362, filed Nov. 7, 2020 which was published under PCT Article 21(2) and which claims priority to Chinese Application No. 202010692404.7, filed Jul. 17, 2020, which are all hereby incorporated herein in their entirety by reference.

TECHNICAL FIELD

This application pertains to the field of head mounted displays, in particular to a three-dimensional reconstruction method, apparatus, device and computer readable storage medium.

BACKGROUND

At present, when advanced head mounted displays such as VR (Virtual Reality) devices, AR (Augmented Reality) devices, and MR (Mediated Reality) devices are used, the visual SLAM (Simultaneous Location and Mapping) technology is often used to reconstruct the use scenarios.

In the prior art, in most application scenarios, the head mounted display usually only needs to reconstruct a simple geometric structure of a complicated scene to meet the user's needs for positioning and virtual reality interaction. However, since there is a great amount of feature information in a real scene, the three-dimensional reconstruction process has the shortcomings of time-consuming and poor reconstruction effect due to excessive redundant feature information and poor feature quality, which seriously restricts the application of head mounted displays.

Therefore, how to improve the efficiency and accuracy of three-dimensional reconstruction of regular objects by head mounted displays and enhance the user experience is an urgent problem to be solved. In addition, other objects, desirable features and characteristics will become apparent from the subsequent summary and detailed description, and the appended claims, taken in conjunction with the accompanying drawings and this background.

SUMMARY

An object of the present disclosure is to provide a three-dimensional reconstruction method, apparatus, device and computer readable storage medium, which can improve the efficiency and accuracy of three-dimensional reconstruction of regular objects by the head mounted display and enhance the user experience.

To solve the above technical problem, the present disclosure provides a three-dimensional reconstruction method, comprising:
  performing sliding calculation on an acquired current image frame according to a preset window size to obtain to-be-processed windows;
  performing point feature extraction and line feature extraction on the to-be-processed windows, and determining corresponding features in each to-be-processed window;
  performing iterative quadtree splitting for circles on each target to-be-processed window to obtain circular regions of interest corresponding to each target to-be-processed window;
  performing feature screening on features in the target circular regions of interest to obtain target features corresponding to each target circular region of interest; and
  performing three-dimensional reconstruction corresponding to the current image frame by using the target features.

Optionally, the corresponding features in each to-be-processed window comprise point features and/or line feature constraint points.

Optionally, the target to-be-processed windows are to-be-processed window having corresponding features, a quantity of circular regions of interest corresponding to each target to-be-processed window is greater than a threshold value, and the circular regions of interest corresponding to each target to-be-processed window comprise a first circular region of interest or comprise the first circular region of interest and a second circular region of interest, the first circular region of interest is a circular region of interest having only one of the features, and the second circular region of interest is a circular region of interest having the line feature constraint points.

Optionally, performing feature screening on features in the target circular regions of interest to obtain target features corresponding to each target circular region of interest comprises:
  performing feature screening on the point features in the target circular regions of interest to obtain a preset quantity of target point features in each target circular region of interest, wherein the target circular region of interest is a circular region of interest in which a quantity of the point features is greater than the preset quantity; and
  according to the target point features and the line feature constraint points in each target circular region of interest, determining the target features corresponding to each target circular region of interest, wherein the target features corresponding to each target circular region of interest comprise the target point features, or comprise the target point features and the line feature constraint points.

Optionally, performing point feature extraction and line feature extraction on the to-be-processed windows, and determining corresponding features in each to-be-processed window comprises:
  performing point feature extraction and line feature extraction on a current to-be-processed window to obtain corresponding point features and line features of the current to-be-processed window; and
  extracting a target quantity of corresponding line feature constraint points of each line feature, wherein the target quantity of corresponding line feature constraint points of a current line feature conform to a linear constraint relationship of the current line feature, and the current line feature is any of the line features.

Optionally, performing iterative quadtree splitting for circles on each target to-be-processed window to obtain circular regions of interest corresponding to each target to-be-processed window comprises:
  determining a root node of a current target to-be-processed window according to the preset window size;

performing quadtree splitting for circles on the current target to-be-processed window with the root node as a center point;

judging whether a current circular region of interest is the second circular region of interest;

if yes, taking the current circular region of interest as the circular region of interest corresponding to the current target to-be-processed window; and if no, judging whether the current circular region of interest is the first circular region of interest.

Optionally, if the current circular region of interest is the first circular region of interest, taking the current circular region of interest as the circular region of interest corresponding to the current target to-be-processed window;

if the current circular region of interest is not the first circular region of interest, judging whether the quantity of circular regions of interest in the current target to-be-processed window is greater than the threshold value;

if it is greater than the threshold value, taking the current circular region of interest as the circular region of interest corresponding to the current target to-be-processed window; and if it is not greater than the threshold value, performing quadtree splitting for circles on the current circular region of interest, and taking one of four circular regions of interest obtained from splitting as the current circular region of interest, and then performing the step of judging whether the current circular region of interest is the second circular region of interest.

Optionally, when the preset quantity is 1, performing feature screening on the point features in the target circular regions of interest to obtain a preset quantity of target point features corresponding to each target circular region of interest comprises:

extracting a preset sampling quantity of sampling points from surroundings of the current target circular region of interest;

comparing a gray gradient of each feature point in the current target circular region of interest with gray gradients of the sampling points to obtain a binary feature quality value of each feature point in the current target circular region of interest; and according to the binary feature quality value, selecting one feature point from all feature points in the current target circular region of interest as the target point feature corresponding to the current target circular region of interest.

Optionally, when the preset sampling quantity is 20, comparing a gray gradient of each feature point in the current target circular region of interest with gray gradients of the sampling points to obtain a binary feature quality value of each feature point in the current target circular region of interest comprises:

determining the binary feature quality value of the current feature point in the current target circular region of interest by $$\begin{cases} 1 & g_i \geq g_{feature}, i \in [1, 20] \\ 0 & g_i < g_{feature}, i \in [1, 20] \end{cases},$$

where $g_{feature}$ is the gray gradient of the current feature point and $g_i$ is the gray gradient of the ith sampling point.

Optionally, performing three-dimensional reconstruction corresponding to the current image frame by using the target features comprises:

optimizing the three-dimensional reconstruction corresponding to the current image frame by using feature matching results of the target features and feature matching results of features in non-target circular regions of interest, wherein the non-target circular regions of interest are circular regions of interest in the circular regions of interest corresponding to each target to-be-processed window other than the target circular region of interest.

Optionally, performing three-dimensional reconstruction corresponding to the current image frame by using the target features comprises:

using a binary feature quality value of each to-be-matched feature to match each to-be-matched feature with a previous image frame and obtain a feature matching result of each to-be-matched feature, wherein the to-be-matched feature includes the target feature;

adding the to-be-matched feature whose feature matching result is successful to a three-dimensional reconstruction feature set; and dividing the to-be-matched features in the three-dimensional reconstruction feature set into three-dimensional corner reference features and three-dimensional face reference features, and performing three-dimensional reconstruction corresponding to the current image frame by using the three-dimensional corner reference features and three-dimensional face reference features, wherein the three-dimensional corner reference features are to-be-matched features that meet a linear constraint relationship of a corresponding line feature.

Optionally, when a current to-be-matched feature is a line feature constraint point, using a binary feature quality value of each to-be-matched feature to match each to-be-matched feature with a previous image frame and obtain a feature matching result of each to-be-matched feature comprises:

using a target descriptor corresponding to the current to-be-matched feature to match the current to-be-matched feature with the previous image frame, wherein the target descriptor is the sum of a first descriptor and a second descriptor, the first descriptor is a binary descriptor obtained by calculating the line feature corresponding to the current to-be-matched feature using an LBD algorithm, and the second descriptor is a binary feature quality value of the current to-be-matched feature.

The present disclosure also provides a three-dimensional reconstruction apparatus, comprising:

a sliding calculation module for performing sliding calculation on an acquired current image frame according to a preset window size to obtain to-be-processed windows;

a feature extraction module for performing point feature extraction and line feature extraction on the to-be-processed windows, and determining corresponding features in each to-be-processed window;

an iterative splitting module for performing iterative quadtree splitting for circles on each target to-be-processed window to obtain circular regions of interest corresponding to each target to-be-processed window;

a feature screening module for performing feature screening on features in the target circular regions of interest to obtain target features corresponding to each target circular region of interest; and a three-dimensional reconstruction module for performing three-dimensional reconstruction corresponding to the current image frame by using the target features.

The present disclosure also provides a three-dimensional reconstruction device, comprising:

a memory for storing a computer program; and a processor for implementing the steps of the three-dimensional reconstruction method as described above when executing the computer program.

The present disclosure also provides a computer readable storage medium having a computer program stored thereon, wherein the steps of the three-dimensional reconstruction method as described above are implemented when the computer program is executed by a processor.

The three-dimensional reconstruction method provided by the present disclosure comprises: performing sliding calculation on an acquired current image frame according to a preset window size to obtain to-be-processed windows; performing point feature extraction and line feature extraction on the to-be-processed windows, and determining corresponding features in each to-be-processed window; performing iterative quadtree splitting for circles on each target to-be-processed window to obtain circular regions of interest corresponding to each target to-be-processed window; performing feature screening on features in the target circular regions of interest to obtain target features corresponding to each target circular region of interest; and performing three-dimensional reconstruction corresponding to the current image frame by using the target features.

Thus, in the present disclosure, line features are introduced in the feature extraction stage of three-dimensional reconstruction, thereby better perceiving the line segment features in the three-dimensional reconstruction scenes and accelerating the reconstruction efficiency of simple regular three-dimensional models. Moreover, in the present disclosure, circular regions are used to establish regions of interest in the image, features are extracted through window sliding, and homogenization and redundancy elimination are performed on the features in three-dimensional reconstruction in the form of quadtree, thereby improving the efficiency and accuracy of three-dimensional reconstruction and enhancing the user experience. In addition, the present disclosure also provides a three-dimensional reconstruction apparatus, device and computer readable storage medium, which also have the above beneficial effects.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

Figure 1:
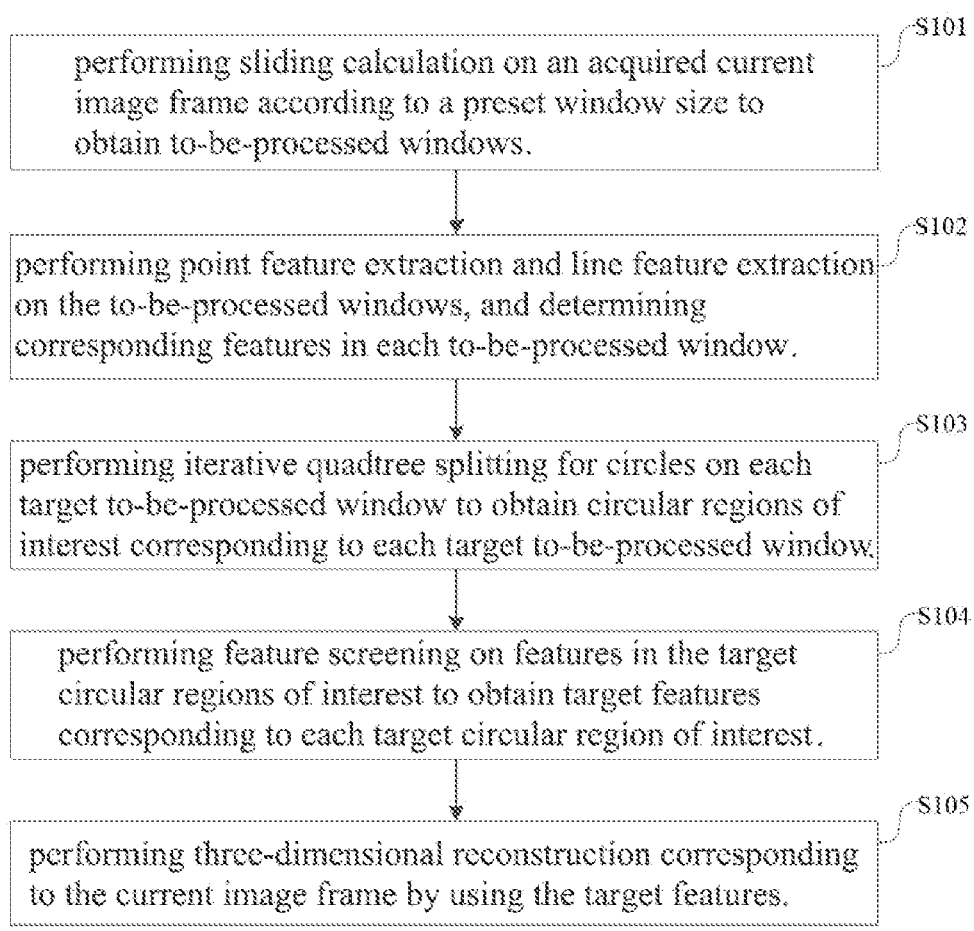
FIG. 1 is a flow chart of a three-dimensional reconstruction method according to an embodiment of the present disclosure.

Please refer to FIG. 1, which is a flow chart of a three-dimensional reconstruction method according to an embodiment of the present disclosure. The method may comprise:

Step 101: performing sliding calculation on an acquired current image frame according to a preset window size to obtain to-be-processed windows.

It will be appreciated that the object of this step may be that the processor in the three-dimensional reconstruction device (such as VR device, AR device, MR device, etc.) extracts windows having a preset window size (i.e., to-be-processed windows) on the current image frame.

Specifically, the quantity of to-be-processed windows obtained in this step may be determined by a size of the current image frame and the preset window size. For example, when the preset window size is a preset window length, the specific relationship may be as follows:

$$N = \frac{L - l}{l'}$$

In the above equation, N is the quantity of to-be-processed windows; L is the length of the current image frame; l is the length of the clipping area of the current image frame, and the feature extraction error caused by the edge distortion can be avoided in the feature extraction process by setting the l; l' is the preset window length.

Step 102: performing point feature extraction and line feature extraction on the to-be-processed windows, and determining corresponding features in each to-be-processed window.

It will be appreciated that this step may be that after the processor has extracted the to-be-processed window from the current image frame, it extracts point features and line features from the to-be-processed window and obtains the data (i.e. features) corresponding to the point features and line features in the to-be-processed window. That is, each to-be-processed window determined in this step may comprise multiple features.

Specifically, the specific content of the corresponding features in each to-be-processed window extracted in this step may be set by the designer according to the use scenarios and user's needs. For example, when only point features and line features are extracted from the to-be-processed window, the corresponding features in each to-be-processed window may comprise point features and/or line features. That is, each feature may be a point feature or a line feature. For example, after point features and line features are extracted from the to-be-processed window, line feature constraint points corresponding to the line features may also be extracted, and the line feature constraint points and the point features obtained are taken as the corresponding features in the to-be-processed window. That is, the corresponding features in each to-be-processed window may comprise point features and/or line feature constraint points corresponding to line features, and each feature may be a point feature or a line feature constraint point. Thus, by extracting the line feature constraint points corresponding to the line features, the line segment features in the three-dimensional reconstruction scenes can be perceived in an anti-occlusion and high-precision way, thereby further accelerating the reconstruction efficiency of simple regular three-dimensional models. There is not any limitation on this in this embodiment.

Specifically, the specific implementation mode of step 101 and this step is not limited in this embodiment. For example, the processor may extract a current to-be-processed window of the current image frame by sliding the window, and then extract point features and line features from the current to-be-processed window, determine the corresponding features in the current to-be-processed window, and then extract the next to-be-processed window. Alternatively, the processor may extract all of the to-be-processed windows of the current image frame, and then extract point features and line features from each to-be-processed window through this step and determine the corresponding features in each to-be-processed window.

Step 103: performing iterative quadtree splitting for circles on each target to-be-processed window to obtain circular regions of interest corresponding to each target to-be-processed window.

The target to-be-processed window in this step may be a to-be-processed window on which iterative quadtree splitting for circles needs to be performed. The specific selection of target to-be-processed windows may be set by designers according to the practical scenarios and user's needs. For example, the target to-be-processed windows may be all of the to-be-processed windows. That is, in this step, the iterative quadtree splitting for circles may be performed on each to-be-processed window corresponding to the current image frame. Alternatively, the target to-be-processed window may also be a to-be-processed window having corresponding features. That is, in this step, the iterative quadtree splitting for circles may be performed on the to-be-processed window having corresponding features extracted by step 102. Alternatively, the target to-be-processed window may also be a to-be-processed window in which there are more features than the feature threshold and/or there are required features (such as line feature constraint points). There is not any limitation on this in this embodiment.

Figure 5:
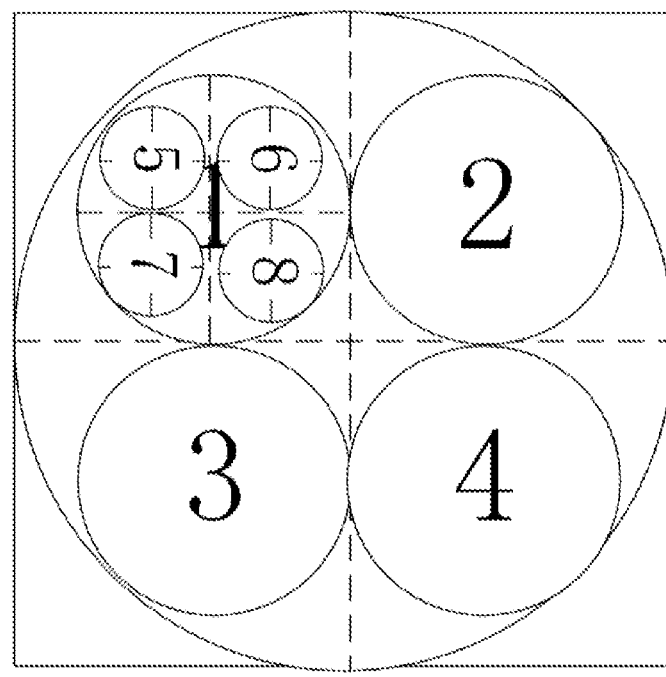
FIG. 5 shows an iterative quadtree splitting for circles according to an embodiment of the present disclosure.
Figure 6:
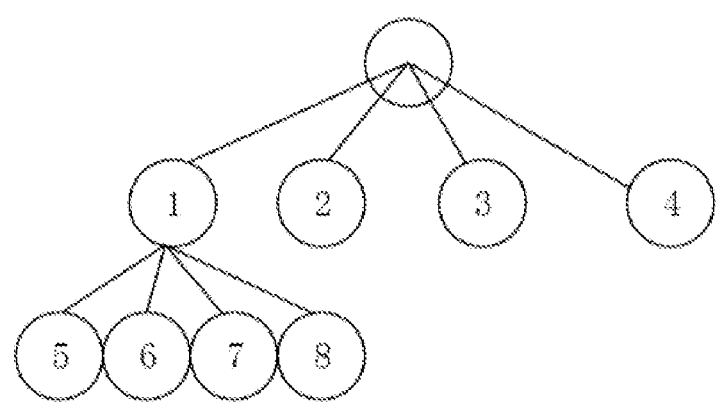
FIG. 6 is a schematic diagram of the structure of an iterative quadtree splitting for circles according to an embodiment of the present disclosure.

It will be appreciated that the object of this step may be that, the processor performs the iterative quadtree splitting for circles as shown in FIG. 5 on each target to-be-processed window, uses the quadtree structure as shown in FIG. 6 to iteratively divide the two-dimensional image frame area, and uses the circular region (i.e., the circular region of interest) to divide the features, so that the gray gradient information of the features in the divided quadtree space may be more accurately perceived.

Specifically, the specific contents of the circular region of interest corresponding to each target to-be-processed window obtained in this step, that is, the specific mode of performing iterative quadtree splitting for circles on each target to-be-processed window, may be set by the designer according to the practical scenarios and user's needs. For example, the quantity of circular regions of interest corresponding to each target to-be-processed window may be greater than a threshold value; each and each circular region of interest corresponding to the target to-be-processed window may have features; the circular region of interest corresponding to each target to-be-processed window may comprise a first circular region of interest or comprise the first circular region of interest and a second circular region of interest, wherein the first circular region of interest may be a circular region of interest in which the quantity of features is less than or equal to a preset quantity. For example, if the preset quantity is 1, the first circular region of interest may be a circular region of interest having only one feature, and the second circular region of interest may be a circular region of interest in which there are features corresponding to the line features (such as line feature constraint points). There is not any limitation on this in this embodiment.

Step 104: performing feature screening on features in the target circular regions of interest to obtain target features corresponding to each target circular region of interest.

The target circular region of interest in this step may be the circular region of interest that needs feature screening. The specific selection of the target circular region of interest may be set by designers according to practical scenarios and user's needs. For example, the target circular region of interest may be a circular region of interest in which the quantity of point features is greater than a preset quantity. That is to say, the feature screening in this step may be performed only on the point features in the target circular region of interest, so as to obtain a preset quantity of point features after screened (i.e. target point features) in each target circular region of interest. For example, this step may comprise: performing feature screening on the point features in the target circular regions of interest to obtain a preset quantity of target point features in each target circular region of interest; according to the target point features and the line feature constraint points in each target circular region of interest, determining the target features corresponding to each target circular region of interest, wherein the target features corresponding to each target circular region of interest comprise the target point features, or comprise the target point features and the line feature constraint points. Alternatively, the target circular region of interest may also be a circular region of interest that has line feature constraint points and point features, or a circular region of interest that has point features (the quantity of which is greater than a preset quantity) but does not have line feature constraint points. That is to say, the feature screening in this step can screen out the point features in the target circular region of interest having line feature constraint points, and can screen out the point features in the target circular region of interest in which a quantity of the point features is greater than a preset quantity, and obtain a preset quantity of point features after screened in the target circular region of interest, so that the target features corresponding to a target circular region of interest may be the existing line features or a preset quantity of point features. There is not any limitation on this in this embodiment.

Step 105: performing three-dimensional reconstruction corresponding to the current image frame by using the target features.

It will be appreciated that the object of this step may be that the obtained target features corresponding to each target circular region of interest are used to perform three-dimensional reconstruction corresponding to the current image frame.

Specifically, regarding the specific mode that the processor uses the target features to perform the three-dimensional reconstruction corresponding to the current image frame in this step, for example, the processor may only use the target features corresponding to the circular region of interest of the target to perform the three-dimensional reconstruction corresponding to the current image frame. Alternatively, the processor may also use the target features corresponding to the target circular region of interest and the features in the non-target circular regions to perform the three-dimensional reconstruction corresponding to the current image frame. The non-target circular regions may be circular regions of interest in the circular regions of interest corresponding to each target to-be-processed window other than the target circular region of interest, such as circular regions of interest in which a quantity of the point features is less than or equal to the preset quantity. Thus, the three-dimensional reconstruction corresponding to the current image frame may be improved by using the non-target circular regions that are sparse but clear. There is not any limitation on this in this embodiment.

In this embodiment, line features are introduced in the feature extraction stage of three-dimensional reconstruction, thereby better perceiving the line segment features in the three-dimensional reconstruction scenes and accelerating the reconstruction efficiency of simple regular three-dimensional models. Moreover, in the present disclosure, circular regions are used to establish regions of interest in the image, features are extracted through window sliding, and homogenization and redundancy elimination are performed on the features in three-dimensional reconstruction in the form of quadtree, thereby improving the efficiency and accuracy of three-dimensional reconstruction and enhancing the user experience.

Figure 2:
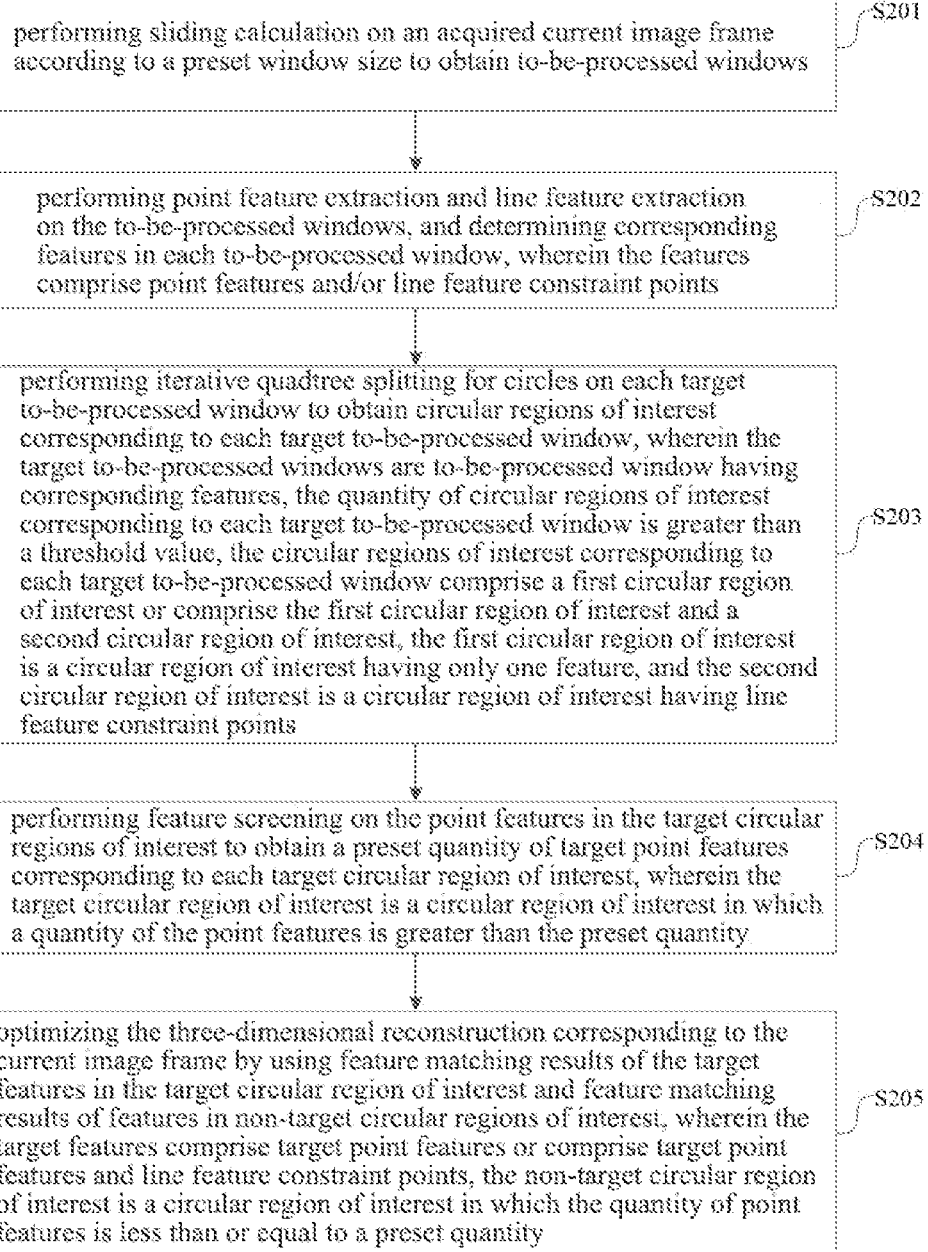
FIG. 2 is a flow chart of another three-dimensional reconstruction method according to an embodiment of the present disclosure.

Please refer to FIG. 2, which is a flow chart of another three-dimensional reconstruction method according to an embodiment of the present disclosure. The method may comprise:

Step 201: performing sliding calculation on an acquired current image frame according to a preset window size to obtain to-be-processed windows.

This step is similar to step 101 and will not be repeated here.

Step 202: performing point feature extraction and line feature extraction on the to-be-processed windows, and determining corresponding features in each to-be-processed window. The features comprise point features and/or line feature constraint points.

It will be appreciated that this step may be that after the processor has extracted the to-be-processed window from the current image frame, it extracts point features and line features from the to-be-processed window to obtain the point features and line features in the to-be-processed window, extracts the line feature constraint points corresponding to the line feature, and take the line feature constraint points and point features obtained as the corresponding features of the to-be-processed window. That is, each to-be-processed window determined in this step may comprise multiple features, and each feature may be a point feature or a line feature constraint point.

That is to say, in this embodiment, line features are introduced in the feature extraction stage of the to-be-processed window, and line feature constraint points are extracted through line features to establish the linear constraint relationship of line features, so that line segment features in the three-dimensional reconstruction scenes can be perceived in an anti-occlusion and high-precision way, and the reconstruction efficiency of simple regular three-dimensional models can be accelerated.

Specifically, the specific implementation mode of step 201 and this step is not limited in this embodiment. For example, the processor may extract the current to-be-processed window of the current image frame by sliding the window, and then extract point features and line features from the current to-be-processed window, determine the corresponding features in the current to-be-processed window, and then extract the next to-be-processed window. Alternatively, the processor may extract all of the to-be-processed windows of the current image frame, and then extract point features and line features from each to-be-processed window through this step and determine the corresponding features of each to-be-processed window.

Correspondingly, the specific mode of performing point feature extraction and line feature extraction on the to-be-processed windows, and determining corresponding features in each to-be-processed window in this step may be set by the designer. For example, the processor may perform point feature extraction and line feature extraction on the current to-be-processed window to obtain corresponding point features and line features of the current to-be-processed window, and extract a target quantity of corresponding line feature constraint points of each line feature, wherein the target quantity of corresponding line feature constraint points of a current line feature conform to a linear constraint relationship of the current line feature, the current line feature is any of the line features, and the current to-be-processed window may be any of the to-be-processed windows. Correspondingly, if the point feature extraction and line feature extraction are performed on the current to-be-processed window, but the line feature corresponding to the current to-be-processed window is not obtained, the feature extraction of the current to-be-processed window may be directly ended, and the point feature corresponding to the current to-be-processed window may be used as the corresponding feature in the current to-be-processed window. There is not any limitation on this in this embodiment.

Specifically, the specific process of performing point feature extraction and line feature extraction on the to-be-processed windows, and determining corresponding features in each to-be-processed window in this step may be set by the designer. For example, with respect to the to-be-processed window, the processor may use the ORB (Oriented FAST and Rotated BRIEF) algorithm to extract point features, and use the ED-lines (a line segment detection algorithm) algorithm to extract line features. If the line feature is extracted, the processor may use the LBD (Line Band Descriptor) algorithm to establish the descriptor of the line feature, and then perform binary conversion to obtain the binary descriptor (i.e., the first descriptor) of the line segment of the line feature. Then, as shown in FIG. 4, three feature points (i.e., line feature constraint points) in the line feature are extracted, and a linear constraint relationship conforming to the line feature is established.

Figure 4:
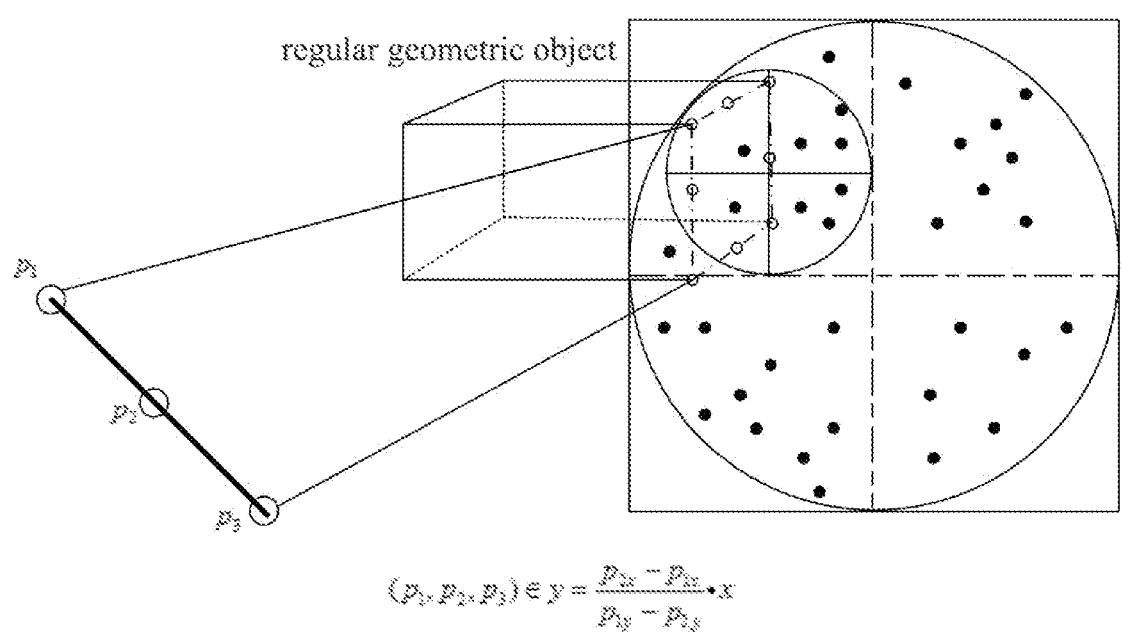
FIG. 4 shows line feature constraint points of a line feature according to an embodiment of the present disclosure.

That is to say, as shown in FIG. 4, the quantity of corresponding line feature constraint points of each may be 3, that is, the target quantity may be 4. In this step, three line feature constraint points may be extracted from a line segment of each line feature, that is, two endpoints ($p_1$ and $p_2$) and the center point ($p_3$) of the segment.

Step 203: performing iterative quadtree splitting for circles on each target to-be-processed window to obtain circular regions of interest corresponding to each target to-be-processed window. The target to-be-processed windows are to-be-processed window having corresponding features, the quantity of circular regions of interest corresponding to each target to-be-processed window is greater than a threshold value, and the circular regions of interest corresponding to each target to-be-processed window comprise a first circular region of interest or comprise the first circular region of interest and a second circular region of interest. The first circular region of interest is a circular region of interest having only one feature, and the second circular region of interest is a circular region of interest having line feature constraint points.

It will be appreciated that the object of this step may be that the processor performs the iterative quadtree splitting for circles as shown in FIG. 5 on each target to-be-processed window, uses the quadtree structure as shown in FIG. 6 to iteratively divide the two-dimensional image frame area, and use the circular regions (i.e., the circular regions of interest) to divide the features, so that the gray gradient information of feature points in the divided quadtree space can be more accurately perceived.

Figure 3:
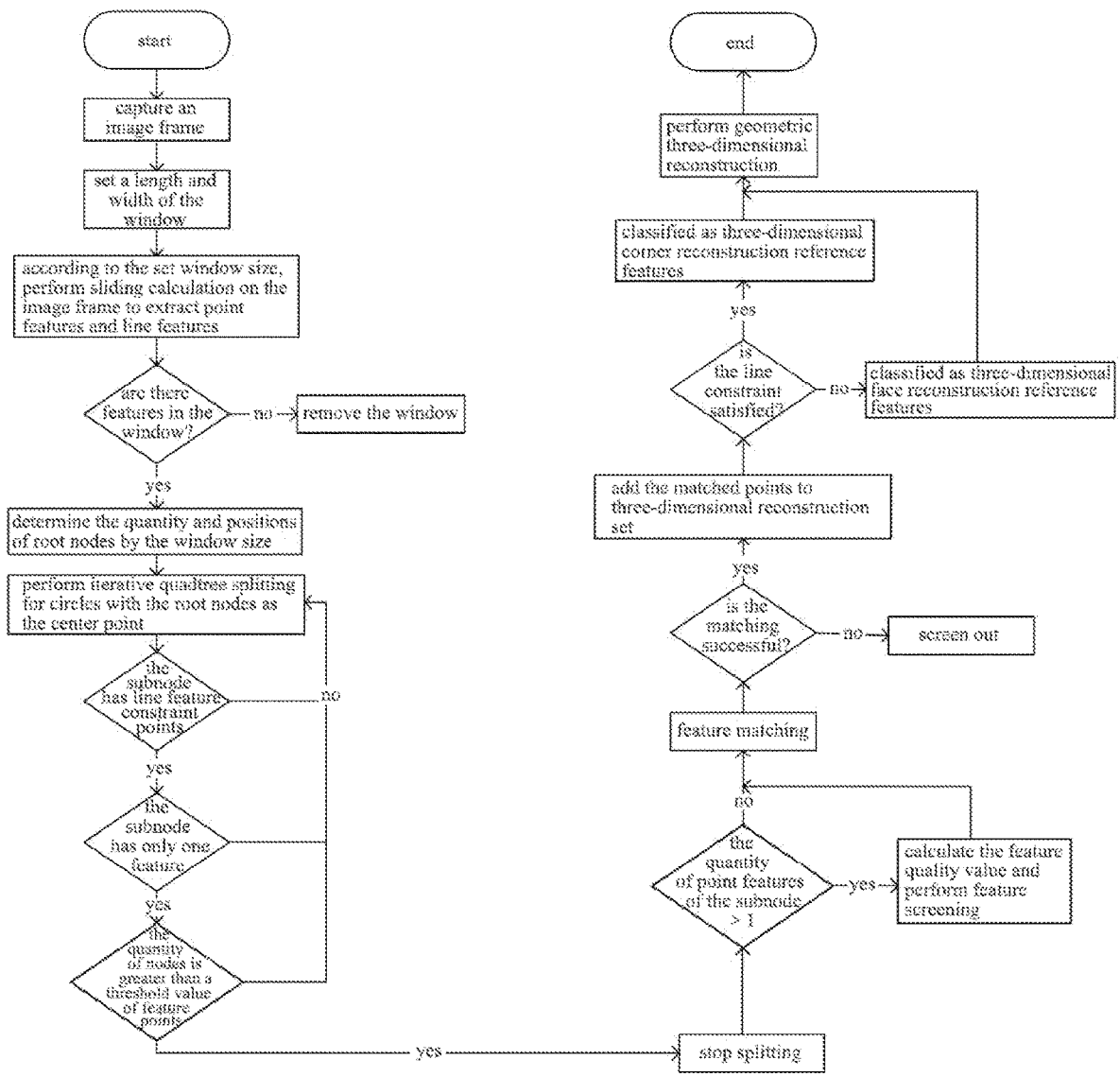
FIG. 3 is a flow diagram of another three-dimensional reconstruction method according to an embodiment of the present disclosure.

The target to-be-processed window in this step may be the to-be-processed window having corresponding features, as shown in FIG. 3, the windows (i.e., the to-be-processed windows) not having corresponding features may be eliminated in this step.

Figure 7:
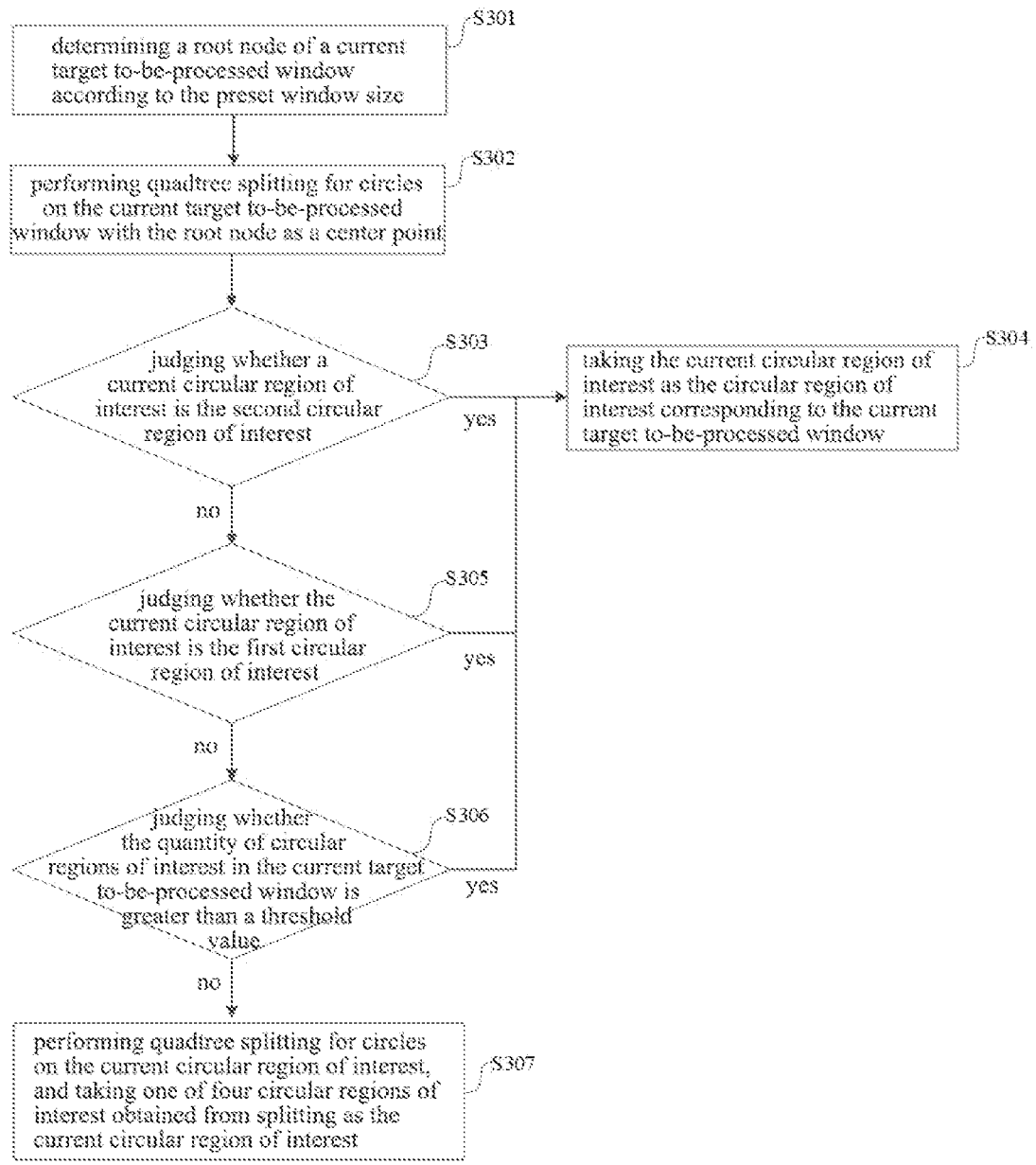
FIG. 7 is a flow chart of an iterative quadtree splitting for circles according to an embodiment of the present disclosure.

Specifically, the specific mode of performing iterative quadtree splitting for circles on each target to-be-processed window in this step may be set by the designer. There is not any limitation on this in this embodiment, as long as the quantity of circular regions of interest corresponding to each target to-be-processed window is greater than the threshold value after iterative splitting, every and each circular region of interest corresponding to the target to-be-processed window has features, and the circular region of interest corresponding to each target to-be-processed window comprises the first circular region of interest or comprises the first circular region of interest and the second circular region of interest. The first circular region of interest is a circular region of interest having only one feature, and the second circular region of interest is a circular region of interest having line feature constraint points. As shown in FIG. 7, this step may specifically comprise the following steps:

Step 301: determining a root node of a current target to-be-processed window according to the preset window size.

The current target to-be-processed window in this step may be any target to-be-processed window on which iterative quadtree splitting for circles needs to be performed. The root node in this step may be the node that needs to be determined for performing the first round iterative quadtree splitting for circles on the current target to-be-processed window, such as the center point of a current target to-be-processed window (i.e., the preset window size).

Specifically, as shown in FIG. 3, this step can determine the size of the current target to-be-processed window corresponding to the preset window size, and determine the quantity and positions of root nodes in the current target to-be-processed window.

Step 302: performing iterative quadtree splitting for circles on the current target to-be-processed window with the root node as a center point.

It will be appreciated that the object of this step may be that the quadtree splitting for circles is performed on the current target to-be-processed window with the determined root node of the current target to-be-processed window as the center point, so as to obtain circular regions of interest corresponding to four subnodes, such as circular regions of interest 1 to 4 shown in FIGS. 5 and 6.

Step 303: judging whether a current circular region of interest is the second circular region of interest; if yes, proceed to step 304; if no, proceed to step 305.

The current circular region of interest in this step may be a circular region of interest having features that is currently processed. The object of this step may be that it is determined whether the current circular region of interest has line feature constraint points by judging whether the current circular region of interest is the second circular region of interest, so that when the current circular region of interest has line feature constraint points, proceed to step 204 to take the current circular region of interest as the circular region of interest corresponding to the current target to-be-processed window, and the quadtree splitting for circles can no longer be performed on the current circular region of interest.

Specifically, the specific selection of the current circular region of interest in this step may be set by the designer. For example, a circular region of interest may be selected as the current circular region of interest from multiple circular regions of interest with the same number of iterations in the order of corresponding number of iterations from small to large.

Step 304: taking the current circular region of interest as the circular region of interest corresponding to the current target to-be-processed window.

It will be appreciated that in this step, by taking the current circular region of interest as the circular region of interest corresponding to the current target to-be-processed window, it can be avoided that the quadtree splitting for circles is performed on the current target to-be-processed window again.

Correspondingly, if after each current circular region of interest is successively taken as the circular region of interest corresponding to the current target to-be-processed window, the quantity of circular regions of interest corresponding to the current target to-be-processed window is not greater than a threshold value, the quadtree splitting for circles may be continued to perform on the circular region of interest corresponding to the current target to-be-processed window having line feature constraint points (i.e., the second circular region of interest), one of the circular regions of interest obtained from the splitting is taken as the current circular region of interest, and proceed to step 303. For example, the quadtree splitting for circles may be performed on the second circular region of interest corresponding to the current target to-be-processed window that has the smallest number of iterations or has the largest quantity of features. There is not any limitation on this in this embodiment.

Specifically, in this step, after taking the current circular region of interest as the circular region of interest corresponding to the current target to-be-processed window, it may further comprise: selecting a circular region of interest from the circular regions of interest that have not been determined as the circular region of interest corresponding to the current target to-be-processed window as the current circular region of interest, and proceed to step 303. For example, if there are circular regions of interest that are not determined as the circular region of interest corresponding to the current target to-be-processed window and have the same number of iterations as the current circular region of interest, one of these circular regions of interest may be selected as the current circular region of interest; if there is not a circular region of interest that is not determined as the circular region of interest corresponding to the current target to-be-processed window and has the same number of iterations as the current circular region of interest, one of the circular regions of interest that have a number of iterations next to the number of iterations of the current circular region of interest may be selected as the current circular region of interest.

Step 305: judging whether the current circular region of interest is the first circular region of interest; if yes, proceed to step 304; if no, proceed to step 306.

The object of this step may be that it is determined whether the current circular region of interest has only one feature (i.e., a point feature) by judging whether the current circular region of interest is the first circular region of interest, so that when the current circular region of interest has only one feature, proceed to step 304 to take the current circular region of interest as the circular region of interest corresponding to the current target to-be-processed window, and the quadtree splitting for circles is no longer performed on the current target to-be-processed window.

Step 306: judging whether the quantity of circular regions of interest in the current target to-be-processed window is greater than a threshold value; if yes, proceed to step 304; if no, proceed to step 307.

It will be appreciated that the object of this step may be that it is determined whether it is necessary to continue the iterative quadtree splitting for circles by comparing the number of iterative splittings (i.e., the quantity of nodes in FIG. 3) performed in the current target to-be-processed window to obtain the current circular region of interest with a preset threshold value (i.e., the threshold value of feature points in FIG. 3), so that when the quantity of circular regions of interest in the current target to-be-processed window is greater than the threshold value, proceed to step 304 to take the current circular region of interest as the circular region of interest corresponding to the current target to-be-processed window, and the quadtree splitting for circles is no longer performed on the current circular region of interest.

Specifically, this embodiment exemplarily illustrates that it is determined whether to continue the iterative quadtree splitting for circles by comparing the number of iterative splittings performed in the current target to-be-processed window to obtain the current circular region of interest with the threshold value. Alternatively, it is determined whether to continue the iterative quadtree splitting for circles by comparing the quantity of circular regions of interest corresponding to the current target to-be-processed window with the threshold value. For example, this step may be that it is determined whether the quantity of circular regions of interest corresponding to the current target to-be-processed window is greater than the threshold value; if yes, proceed to step 304; if no, proceed to step 307. Correspondingly, the threshold value for comparing with the quantity of circular regions of interest corresponding to the current target to-be-processed window may be 1 less than the threshold value in this step.

It should be noted that this embodiment exemplarily illustrates the iterative method that the quadtree splitting for circles is performed each time on one circular region of interest (i.e., the current circular region of interest), that is, when the current circular region of interest is not the second circular region of interest or the first circular region of interest, it is directly judged through this step whether the quantity of circular regions of interest in the current target to-be-processed window is greater than the threshold value, so that when the quantity of circular regions of interest in the current target to-be-processed window is not greater than the threshold, the quadtree splitting for circles is directly performed on the current circular region of interest. Alternatively, in this step, when the current circular region of interest is not the second circular region of interest or the first circular region of interest, the next circular region of interest whose number of iterations is the same as the current circular region of interest may be selected as the current circular region of interest, then go back to step 303, and until there is not a circular region of interest whose number of iterations is the same as the current circular region of interest, it is judged whether the quantity of circular regions of interest in the current target to-be-processed window is greater than the threshold value; if no, the quadtree splitting for circles may be performed sequentially or simultaneously on all of the circular regions of interest that are not the second circular region of interest or the first circular region of interest and have the same number of iterations as the current circular region of interest, and the current circular region of interest corresponding to the next number of iterations is selected, then proceed to step 303; if yes, all of the circular regions of interest that are not the second circular region of interest or the first circular region of interest and have the same number of iterations as the current circular region of interest may be used as the circular regions of interest corresponding to the current target to-be-processed window.

Step 307: performing quadtree splitting for circles on the current circular region of interest, and taking one of four circular regions of interest obtained from splitting as the current circular region of interest, then proceed to step 303.

It will be appreciated that the object of this step may be that, when the current circular region of interest is not the first circular region of interest or the second circular region of interest, and the quantity of circular regions of interest in the current target to-be-processed window is not greater than the threshold value, the quadtree splitting for circles is directly performed on the current circular region of interest to increase the quantity of circular regions of interest in the current target to-be-processed window, and by taking one of the four circular regions of interest obtained by splitting as the current circular region of interest and proceeding to step 303, it is continued to determine the circular region of interest corresponding to the current target to-be-processed window.

Specifically, in this step, before taking one of the four circular regions of interest obtained by splitting as the current circular region of interest, it may further comprise: determining whether there is a circular region of interest that has features and has the same iteration times as the current circular region of interest, that is, a circular region of interest that has not been determined as the circular region of interest corresponding to the current target to-be-processed window; if it exists, selecting one circular region of interest as the current circular region of interest from the circular regions of interest that have features and have the same number of iterations as the current circular region of interest; if it does not exist, then one of the four circular regions of interest split from the current circular region of interest is taken as the current circular region of interest.

It should be noted that the method of iterative quadtree splitting for circles shown in FIG. 7 exemplarily illustrates that the quadtree splitting for circles is performed each time on one circular region of interest (i.e., the current circular region of interest), but the iterative quadtree splitting for circles may be performed in other ways. For example, when the quantity of circular regions of interest in the current target to-be-processed window is not greater than the threshold value, the quadtree splitting for circles is performed simultaneously on multiple circular regions of interest that are not the first circular region of interest or the second circular region of interest and have the same number of iterations. There is not any limitation on this in this embodiment.

Further, after obtaining the circular regions of interest corresponding to each target to-be-processed window in this step, since the circular regions of interest are used, some features will be left in surroundings of the regions, which are decentralized. In this step, the features outside the circular regions of interest corresponding to the target to-be-processed window may be retained to prevent the phenomena of excessive homogenization, too few features, etc.; moreover, they may be used to correct the depth and pose information in virtual reality activities during three-dimensional reconstruction.

Step 204: performing feature screening on the point features in the target circular regions of interest to obtain a preset quantity of target point features corresponding to each target circular region of interest, wherein the target circular region of interest is a circular region of interest in which a quantity of the point features is greater than the preset quantity;

It will be appreciated that the object of this step may be that the quantity of point features in the circular region of interest corresponding to each target to-be-processed window can be less than or equal to the preset quantity by performing feature screening on the point features in the target circular regions of interest, so as to reduce redundant point features in three-dimensional reconstruction while retaining the line feature constraint points in the circular regions of interest.

Figure 8:
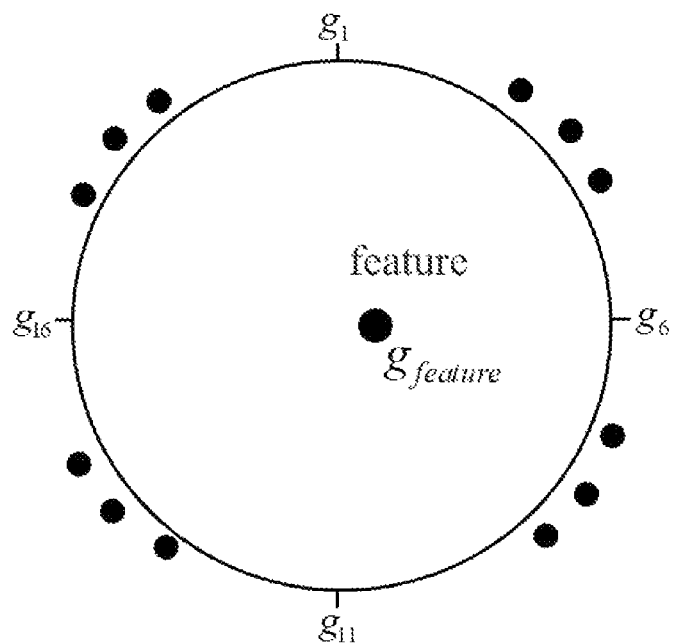
FIG. 8 is a schematic diagram of sampling a circular region of interest according to an embodiment of the present disclosure.

Specifically, the specific mode of performing feature screening on the point features in the target circular regions of interest to obtain a preset quantity of target point features in each target circular region of interest in this step may be set by the designer. For example, when the preset quantity is 1, in this step, a preset sampling quantity of sampling points may be extracted from the surrounding of the current target circular region of interest; the gray gradient of each feature point in the current target circular region of interest is compared with the gray gradients of the sampling points, and the binary feature quality value of each feature point in the current target circular region of interest is obtained; according to the binary feature quality value, a feature point is selected from all feature points in the current target circular region of interest as the target point feature corresponding to the current target circular region of interest. The current target circular region of interest may be any target circular region of interest having multiple point features. As shown in FIG. 8, when the preset sampling quantity is 20, in this step, twenty sampling points may be extracted in equal arc length from a circle outside the current target circular region of interest, the gray gradient information ($g_i$) at these sampling points is compared with the gray gradient information ($g_{feature}$) of each feature point in the current target circular region of interest, and the binary feature quality value of each feature point is obtained. For example, the binary feature quality value of a current feature point in the current target circular region of interest is determined by the following equation:

$$\begin{cases} 1 & g_i \geq g_{feature}, i \in [1, 20] \\ 0 & g_i < g_{feature}, i \in [1, 20] \end{cases}$$

In the above equation, $g_{feature}$ is the gray gradient of the current feature point and $g_i$ is the gray gradient of the ith sampling point.

Correspondingly, the specific mode of according to the binary feature quality value of each feature point in the current target circular region of interest, selecting a feature point from all feature points in the current target circular region of interest as the target point feature corresponding to the current target circular region of interest may be set by the designer. For example, the feature point having the largest quantity of 1 in the binary feature quality values may be selected as the target point feature corresponding to the current target circular region of interest; alternatively, the feature point having the largest quantity of 0 in the binary feature quality values may be selected as the target point feature corresponding to the current target circular region of interest; alternatively, the target point feature corresponding to the current target circular region of interest may be selected in other ways. As long as the processor can use the binary feature quality value of each feature point in the current target circular region of interest to determine the target point feature corresponding to the current target circular region of interest, there is not any limitation on this in this embodiments.

Specifically, the target circular region of interest in this step may also be a circular region of interest in which the quantity of point features is greater than a preset quantity and there is not a line feature constraint point.

Step 205: optimizing the three-dimensional reconstruction corresponding to the current image frame by using feature matching results of the target features in the target circular region of interest and feature matching results of features in non-target circular regions of interest. The target features comprise target point features or comprise target point features and line feature constraint points. The non-target circular region of interest is a circular region of interest in which the quantity of point features is less than or equal to a preset quantity.

It will be appreciated that the target features in the target circular region of interest in this step may be the features determined according to the target point features and line feature constraint points in the target circular region of interest, that is, the target circular region of interest may comprise multiple target point features, and each target point feature or line feature constraint point in a target circular region of interest may be used as a target feature of the target circular region of interest. Correspondingly, before this step, the method may further comprise the step of determining the target features corresponding to each target circular region of interest according to the target point features and line feature constraint points in each target circular region of interest. In this step, in the non-target circular region of interest, there are line feature constraint points, and/or there are point features the quantity of which is less than or equal to the preset quantity. The object of this step may be to use the feature matching results between the target features in the target circular region of interest and the features in the non-target circular region of interest with the preset image frame (such as the previous image frame), and reconstruct the three-dimensional corresponding to the current image frame using the target features and features whose feature matching results are successful, thereby realizing the geometric three-dimensional reconstruction corresponding to the current image frame.

Specifically, this step may comprise the step of matching the target features in the target circular region of interest and the features in the non-target circular region of interest with the preset image frame to obtain the feature matching results. For example, when the preset image frame is the previous image frame, the processor may use a binary feature quality value of each to-be-matched feature to match each to-be-matched feature with a previous image frame, and obtain the feature matching result of each to-be-matched feature, wherein the to-be-matched features include the target features in the target circular region of interest and the features in the non-target circular region of interest. For example, when the current to-be-matched feature is a point feature or a target point feature, the binary feature quality value obtained by the above binary feature quality value calculation method is directly used for feature matching with the previous image frame to obtain the feature matching result of the current to-be-matched feature. When the current to-be-matched feature is a line feature constraint point, the target descriptor ($D_p$) corresponding to the current to-be-matched feature may be used to match the current to-be-matched feature with the previous image frame, wherein the target descriptor is the sum of the first descriptor ($D_{LBD}$) and the second descriptor ($D_g$), that is, $D_p=D_{LBD}+D_g$. The first descriptor is the binary descriptor of the line feature corresponding to the current to-be-matched feature calculated by the LBD algorithm. The second descriptor is the binary feature quality value of the current to-be-matched feature, that is, the binary feature quality value of the current to-be-matched feature obtained by using the above binary feature quality value calculation method. In other words, in step 203, the gray gradient of each feature in each circular region of interest may be compared with the gray gradient of the corresponding sampling point to obtain the binary feature quality value of each feature in each circular region of interest.

Correspondingly, this step may be: adding the to-be-matched feature whose feature matching result is successful to a three-dimensional reconstruction feature set; and dividing the to-be-matched features in the three-dimensional reconstruction feature set into three-dimensional corner reference features and three-dimensional face reference features, and performing three-dimensional reconstruction corresponding to the current image frame by using the three-dimensional corner reference features and three-dimensional face reference features, wherein the three-dimensional corner reference features are to-be-matched features that meet a linear constraint relationship of a corresponding line feature, and the three-dimensional face reference features are other to-be-matched features whose feature matching result is successful. As shown in FIG. 3, after the matched point (i.e., the to-be-matched feature whose point feature matching result is successfully) is added to the three-dimensional reconstruction feature set, the point feature and the line feature constraint point in the matching point may be distinguished by judging whether the matching point meets the line constraint (i.e., the linear constraint relationship of the corresponding line feature), so as to classify the corresponding reference features and improve the efficiency of three-dimensional reconstruction.

In this embodiment, line features are introduced in the feature extraction stage of three-dimensional reconstruction, thereby better perceiving the line segment features in the three-dimensional reconstruction scenes and accelerating the reconstruction efficiency of simple regular three-dimensional models. Moreover, in the present disclosure, circular regions are used to establish regions of interest in the image, features are extracted through window sliding, and homogenization and redundancy elimination are performed on the features in three-dimensional reconstruction in the form of quadtree, thereby improving the efficiency and accuracy of three-dimensional reconstruction and enhancing the user experience.

Figure 9:
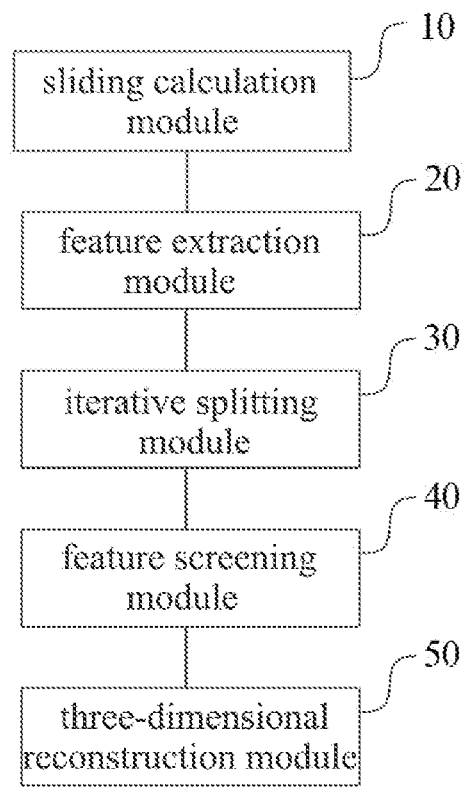
FIG. 9 is a block diagram of the structure of a three-dimensional reconstruction apparatus according to an embodiment of the present disclosure.

Please refer to FIG. 9, which is a block diagram of the structure of a three-dimensional reconstruction apparatus according to an embodiment of the present disclosure. The apparatus may comprise:

- a sliding calculation module 10 for performing slide calculation on an acquired current image frame according to a preset window size to obtain to-be-processed windows;
- a feature extraction module 20 for performing point feature extraction and line feature extraction on the to-be-processed windows, and determining corresponding features in each to-be-processed window;
- an iterative splitting module 30 for performing iterative quadtree splitting for circles on each target to-be-processed window to obtain circular regions of interest corresponding to each target to-be-processed window;
- a feature screening module 40 for performing feature screening on features in the target circular regions of interest to obtain target features corresponding to each target circular region of interest; and
- a three-dimensional reconstruction module 50 for performing three-dimensional reconstruction corresponding to the current image frame by using the target features.

Optionally, the corresponding features in each to-be-processed window may comprise point features and/or line feature constraint points.

Optionally, the target to-be-processed windows may be to-be-processed window having corresponding features, a quantity of circular regions of interest corresponding to each target to-be-processed window may be greater than a threshold value, and the circular regions of interest corresponding to each target to-be-processed window may comprise a first circular region of interest or comprise the first circular region of interest and a second circular region of interest, the first circular region of interest may be a circular region of interest having only one of the features, and the second circular region of interest may be a circular region of interest having the line feature constraint points.

Optionally, the feature screening module 40 may comprise:

- a point feature screening sub-module for performing feature screening on the point features in the target circular regions of interest to obtain a preset quantity of target point features in each target circular region of interest, wherein the target circular region of interest is a circular region of interest in which a quantity of the point features is greater than the preset quantity; and a determination sub-module for according to the target point features and the line feature constraint points in each target circular region of interest, determining the target features corresponding to each target circular region of interest, wherein the target features corresponding to each target circular region of interest comprise the target point features, or comprise the target point features and the line feature constraint points.

Optionally, the feature extraction module 20 may comprise:

a first extraction sub-module for performing point feature extraction and line feature extraction on a current to-be-processed window to obtain corresponding point features and line features of the current to-be-processed window; and a second extraction sub-module for extracting a target quantity of corresponding line feature constraint points of each line feature, wherein the target quantity of corresponding line feature constraint points of a current line feature conform to a linear constraint relationship of the current line feature, and the current line feature is any of the line features.

Optional, iterative splitting module 30 may comprise:

a root node determination sub-module for determining a root node of a current target to-be-processed window according to the preset window size;

a splitting sub-module for performing iterative quadtree splitting for circles on the current target to-be-processed window with the root node as a center point;

a first judgment sub-module for judge whether the current circular region of interest is the second circular region of interest, and if it is the second circular region of interest, taking the current circular region of interest as the circular region of interest corresponding to the current target to-be-processed window; and a second judgment sub-module for judge whether the current circular region of interest is the first circular region of interest if it is not the second circular region of interest, and if it is the first circular region of interest, taking the current circular region of interest as the circular region of interest corresponding to the current target to-be-processed window, wherein the first circular region of interest is a circular region of interest having only one point feature.

Optionally, the iterative splitting module 30 may further comprise:

a third judgment sub-module for judge whether the quantity of circular regions of interest in the current target to-be-processed window is greater than the threshold if it is not the first circular region of interest, and if it is greater than the threshold value, taking the current circular region of interest as the circular region of interest corresponding to the current target to-be-processed window; and an iteration sub-module for performing quadtree splitting for circles on the current circular region of interest if it is not greater than the threshold value, taking one of four circular regions of interest obtained from splitting as the current circular region of interest, and sending a start signal to the first judgment sub-module.

Optionally, when the preset quantity is 1, the feature screening module 40 may comprise:

a sampling sub-module for extracting a preset sampling quantity of sampling points from surroundings of the current target circular region of interest;

a comparing sub-module for comparing a gray gradient of each feature point in the current target circular region of interest with gray gradients of the sampling points to obtain a binary feature quality value of each feature point in the current target circular region of interest; and a screening sub-module for according to the binary feature quality value, selecting a feature point from all feature points in the current target circular region of interest as the target point feature corresponding to the current target circular region of interest.

Optionally, when the preset sampling quantity is 20, the comparing sub-module may be specifically for determining the binary feature quality value of the current feature point in the current target circular region of interest by $$\begin{cases} 1 & g_i \geq g_{feature}, i \in [1, 20] \\ 0 & g_i < g_{feature}, i \in [1, 20] \end{cases},$$

where $g_{feature}$ is the gray gradient of the current feature point and $g_i$ is the gray gradient of the ith sampling point.

Optionally, the three-dimensional reconstruction module 50 may be specifically for optimizing the three-dimensional reconstruction corresponding to the current image frame by using feature matching results of the target features and feature matching results of features in non-target circular regions of interest, wherein the non-target circular regions of interest are circular regions of interest in the circular regions of interest corresponding to each target to-be-processed window other than the target circular region of interest.

Optionally, the three-dimensional reconstruction module 50 may comprise:

a feature matching sub-module for using a binary feature quality value of each to-be-matched feature to match each to-be-matched feature with a previous image frame and obtain a feature matching result of each to-be-matched feature, wherein the features to be matched comprise the target features in the target circular region of interest and the features in the non-target circular region of interest;

a distribution sub-module for adding the to-be-matched feature whose feature matching result is successful to a three-dimensional reconstruction feature set; and a dividing and reconstruction sub-module for dividing the to-be-matched features in the three-dimensional reconstruction feature set into three-dimensional corner reference features and three-dimensional face reference features, and performing three-dimensional reconstruction corresponding to the current image frame by using the three-dimensional corner reference features and three-dimensional face reference features, wherein the three-dimensional corner reference features are to-be-matched features that meet a linear constraint relationship of a corresponding line feature.

Optionally, when the current to-be-matched feature is a line feature constraint point, the feature matching sub-module may be specifically for using a target descriptor corresponding to the current to-be-matched feature to match the current to-be-matched feature with the previous image frame, wherein the target descriptor is the sum of a first descriptor and a second descriptor, the first descriptor is a binary descriptor obtained by calculating the line feature corresponding to the current to-be-matched feature using an LBD algorithm, and the second descriptor is a binary feature quality value of the current to-be-matched feature.

In the embodiment, the embodiment of the present disclosure introduces line features in the feature extraction stage of three-dimensional reconstruction, so as to better perceive the line segment features in the three-dimensional reconstruction scenes and accelerate the reconstruction efficiency of simple regular three-dimensional models; In addition, the present disclosure uses circular regions to establish regions of interest in the image, and carries out feature extraction through window sliding, and homogenizes and de redundantly processes the features in three-dimensional reconstruction in the manner of quadtree, thus improving the efficiency and accuracy of three-dimensional reconstruction and enhancing the user experience.

Figure 10:
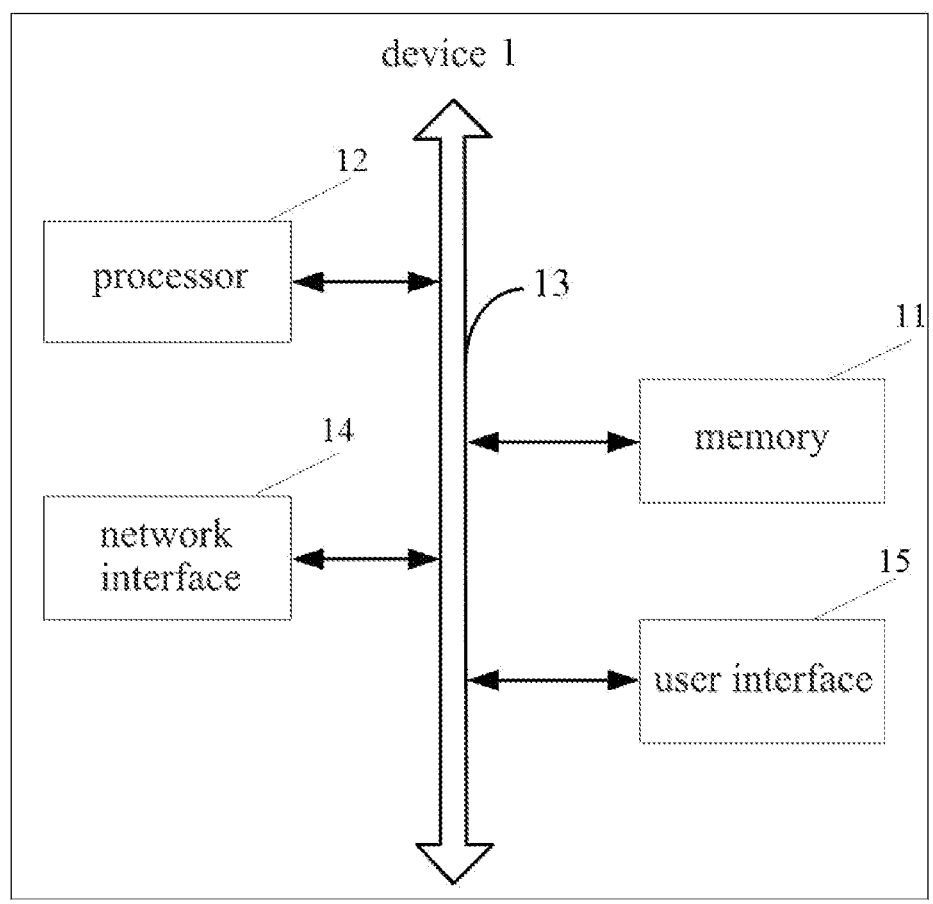
FIG. 10 is a schematic diagram of the structure of a three-dimensional reconstruction device according to an embodiment of the present disclosure.

Please refer to FIG. 10, which is a schematic diagram of the structure of a three-dimensional reconstruction device according to an embodiment of the present disclosure. The device 1 may comprise:
- a memory 11 for storing a computer program; and
- a processor 12 for implementing the steps of the three-dimensional reconstruction methods according to the above embodiments when executing the computer program.

The device 1 may specifically be a VR device, AR device, MR device or other device that need three-dimensional reconstruction. The device 1 may comprise the memory 11, the processor 12 and a bus 13.

The memory 11 comprises at least one type of readable storage medium, and the readable storage medium includes flash memory, hard disk, multimedia card, card memory (such as SD or DX memory, etc.), magnetic memory, disk, optical disk, etc. In some embodiments, the memory 11 may be an internal storage unit of the device 1. In other embodiments, the memory 11 may also be an external storage device of the device 1, such as a plug-in hard disk, smart media card (SMC), secure digital (SD) card, flash card, etc. that are equipped on the AR device, VR device, or MR device. Further, the memory 11 may also comprise both an internal storage unit of the device 1 and an external storage device. The memory 11 can not only be used to store the application software installed on the device 1 and various kinds of data, such as the codes of the program executing the three-dimensional reconstruction method, but also be used to temporarily store the data that has been output or will be output.

In some embodiments, the processor 12 may be a central processing unit (CPU), controller, microcontroller, microprocessor or other data processing chip, which is used to run the program codes or processing data stored on the memory 11, such as the codes of the program that executes the three-dimensional reconstruction method.

The bus 13 may be a peripheral component interconnect (PCI) bus or an extended industry standard architecture (EISA) bus. The bus can be divided into address bus, data bus, control bus, etc. For ease of representation, only one thick line is used in FIG. 10, but it does not mean that there is only one bus or one type of bus.

Further, the device may further comprise a network interface 14. Optionally, the network interface 14 may optionally include a wired interface and/or a wireless interface (such as a WI-FI interface, a Bluetooth interface, etc.), which is usually used to establish a communication connection between the device 1 and other electronic devices.

Optionally, the device 1 may further comprise a user interface 15. The user interface 15 may include a display, and an input unit such as a press key. Optionally, the optional user interface 15 may further comprise a standard wired interface and a wireless interface. Optionally, in some embodiments, the display may be an LED display, a liquid crystal display, a touch type liquid crystal display, an OLED (organic light emitting diode) touch device, etc. The display may also be appropriately called a display screen or a display unit, which is used to display the information processed in the device 1 and display the visualized user interface.

FIG. 10 only shows the device 1 with components 11-15. It will be appreciated by those skilled in the art that the structure shown in FIG. 10 does not limit the device 1, and may comprise fewer or more components than shown in FIG. 10, or have combinations of some components, or have different component arrangements.

In addition, an embodiment of the present disclosure also provides a computer readable storage medium. A computer program is stored on the storage medium. When the computer program is executed by a processor, the steps of the three-dimensional reconstruction method provided by the above embodiment are implemented.

The storage medium may include U disk, mobile hard disk, read only memory (ROM), random access memory (RAM), magnetic disc or optical disc and other media that can store program codes.

The embodiments in this specification are described in a parallel or progressive manner. Each embodiment focuses on the differences from other embodiments. The same or similar parts of each embodiment may be referred by each other. As for the devices disclosed in the embodiments, since they correspond to the methods disclosed in the embodiments, their description is relatively simple, and relevant parts may refer to the description of the method part.

Those skilled in the art will also understand that the units and algorithm steps of the examples described in conjunction with the embodiments disclosed herein can be implemented in electronic hardware, computer software or a combination thereof. In order to clearly illustrate the interchangeability of hardware and software, the composition and steps of the examples have been generally described in the above description according to functions. Whether these functions are implemented in hardware or software depends on the specific application and design constraints of the technical solution. Those skilled in the art may use different methods to realize the described functions for each specific application, but such realization shall not be considered beyond the scope of the present disclosure.

The steps of a method or algorithm described in conjunction with the embodiments disclosed herein may be directly implemented by hardware, by software module executed by a processor, or by a combination of hardware and software. The software module may be placed in a random access memory (RAM), an internal memory, read only memory (ROM), an electrically programmable ROM, an electrically erasable programmable ROM, a register, a hard disk, a removable disk, a CD-ROM, or any other form of storage medium known in the art.

It should also be noted that, relational terms such as first and second used herein are only to distinguish one entity or operation from another, and do not necessarily require or imply that there is such actual relationship or order among those entities or operations. Moreover, the terms "comprise", "include" or any other variants are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase "comprising a . . . " does not exclude the case that there are other same elements in the process, method, article or apparatus including the element.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A three-dimensional reconstruction method, comprising:
    performing sliding calculation on an acquired current image frame according to a preset window size to obtain to-be-processed windows;
    performing point feature extraction and line feature extraction on the to-be-processed windows, and determining corresponding features in each to-be-processed window;
    performing iterative quadtree splitting for circles on each target to-be-processed window to obtain circular regions of interest corresponding to each target to-be-processed window;
    performing feature screening on features in the target circular regions of interest to obtain target features corresponding to each target circular region of interest; and
    performing three-dimensional reconstruction corresponding to the current image frame by using the target features.

2. The three-dimensional reconstruction method according to claim 1, wherein the corresponding features in each to-be-processed window comprise point features and/or line feature constraint points.

3. The three-dimensional reconstruction method according to claim 2, wherein the target to-be-processed windows are to-be-processed window having corresponding features, a quantity of circular regions of interest corresponding to each target to-be-processed window is greater than a threshold value, and the circular regions of interest corresponding to each target to-be-processed window comprise a first circular region of interest or comprise the first circular region of interest and a second circular region of interest, the first circular region of interest is a circular region of interest having only one of the features, and the second circular region of interest is a circular region of interest having the line feature constraint points.

4. The three-dimensional reconstruction method according to claim 2, wherein performing feature screening on features in the target circular regions of interest to obtain target features corresponding to each target circular region of interest comprises:
    performing feature screening on the point features in the target circular regions of interest to obtain a preset quantity of target point features in each target circular region of interest, wherein the target circular region of interest is a circular region of interest in which a quantity of the point features is greater than the preset quantity; and
    according to the target point features and the line feature constraint points in each target circular region of interest, determining the target features corresponding to each target circular region of interest, wherein the target features corresponding to each target circular region of interest comprise the target point features, or comprise the target point features and the line feature constraint points.

5. The three-dimensional reconstruction method according to claim 2, wherein performing point feature extraction and line feature extraction on the to-be-processed windows, and determining corresponding features in each to-be-processed window comprises:
    performing point feature extraction and line feature extraction on a current to-be-processed window to obtain corresponding point features and line features of the current to-be-processed window; and
    extracting a target quantity of corresponding line feature constraint points of each line feature, wherein the target quantity of corresponding line feature constraint points of a current line feature conform to a linear constraint relationship of the current line feature, and the current line feature is any of the line features.

6. The three-dimensional reconstruction method according to claim 3, wherein performing iterative quadtree splitting for circles on each target to-be-processed window to obtain circular regions of interest corresponding to each target to-be-processed window comprises:
    determining a root node of a current target to-be-processed window according to the preset window size;
    performing iterative quadtree splitting for circles on the current target to-be-processed window with the root node as a center point;
    judging whether a current circular region of interest is the second circular region of interest;
    if yes, taking the current circular region of interest as the circular region of interest corresponding to the current target to-be-processed window; and
    if no, judging whether the current circular region of interest is the first circular region of interest.

7. The three-dimensional reconstruction method according to claim 6, wherein if the current circular region of interest is the first circular region of interest, taking the current circular region of interest as the circular region of interest corresponding to the current target to-be-processed window;
    if the current circular region of interest is not the first circular region of interest, judging whether the quantity of circular regions of interest in the current target to-be-processed window is greater than the threshold value;
    if it is greater than the threshold value, taking the current circular region of interest as the circular region of interest corresponding to the current target to-be-processed window; and
    if it is not greater than the threshold value, performing quadtree splitting for circles on the current circular region of interest, and taking one of four circular regions of interest obtained from splitting as the current circular region of interest, and then performing the step of judging whether the current circular region of interest is the second circular region of interest.

8. The three-dimensional reconstruction method according to claim 4, wherein when the preset quantity is 1, performing feature screening on the point features in the target circular regions of interest to obtain a preset quantity of target point features corresponding to each target circular region of interest comprises:

extracting a preset sampling quantity of sampling points from surroundings of the current target circular region of interest;

comparing a gray gradient of each feature point in the current target circular region of interest with gray gradients of the sampling points to obtain a binary feature quality value of each feature point in the current target circular region of interest; and according to the binary feature quality value, selecting one feature point from all feature points in the current target circular region of interest as the target point feature corresponding to the current target circular region of interest.

9. The three-dimensional reconstruction method according to claim 8, wherein when the preset sampling quantity is 20, comparing a gray gradient of each feature point in the current target circular region of interest with gray gradients of the sampling points to obtain a binary feature quality value of each feature point in the current target circular region of interest comprises:

determining the binary feature quality value of the current feature point in the current target circular region of interest by $$\begin{cases} 1 & g_i \geq g_{feature}, i \in [1, 20] \\ 0 & g_i < g_{feature}, i \in [1, 20] \end{cases},$$

where $g_{feature}$ is the gray gradient of the current feature point and $g_i$ is the gray gradient of the ith sampling point.

10. The three-dimensional reconstruction method according to claim 1, wherein performing three-dimensional reconstruction corresponding to the current image frame by using the target features comprises:

optimizing the three-dimensional reconstruction corresponding to the current image frame by using feature matching results of the target features and feature matching results of features in non-target circular regions of interest, wherein the non-target circular regions of interest are circular regions of interest in the circular regions of interest corresponding to each target to-be-processed window other than the target circular region of interest.

11. The three-dimensional reconstruction method according to claim 10, wherein performing three-dimensional reconstruction corresponding to the current image frame by using the target features comprises:

using a binary feature quality value of each to-be-matched feature to match each to-be-matched feature with a previous image frame and obtain a feature matching result of each to-be-matched feature, wherein the to-be-matched feature includes the target features;

adding the to-be-matched feature whose feature matching result is successful to a three-dimensional reconstruction feature set; and dividing the to-be-matched features in the three-dimensional reconstruction feature set into three-dimensional corner reference features and three-dimensional face reference features, and performing three-dimensional reconstruction corresponding to the current image frame by using the three-dimensional corner reference features and three-dimensional face reference features, wherein the three-dimensional corner reference features are to-be-matched features that meet a linear constraint relationship of a corresponding line feature.

12. The three-dimensional reconstruction method according to claim 11, wherein when a current to-be-matched feature is a line feature constraint point, using a binary feature quality value of each to-be-matched feature to match each to-be-matched feature with a previous image frame and obtain a feature matching result of each to-be-matched feature comprises:

using a target descriptor corresponding to the current to-be-matched feature to match the current to-be-matched feature with the previous image frame, wherein the target descriptor is the sum of a first descriptor and a second descriptor, the first descriptor is a binary descriptor obtained by calculating the line feature corresponding to the current to-be-matched feature using an LBD algorithm, and the second descriptor is a binary feature quality value of the current to-be-matched feature.

13. The three-dimensional reconstruction method according to claim 2, wherein performing three-dimensional reconstruction corresponding to the current image frame by using the target features comprises:

optimizing the three-dimensional reconstruction corresponding to the current image frame by using feature matching results of the target features and feature matching results of features in non-target circular regions of interest, wherein the non-target circular regions of interest are circular regions of interest in the circular regions of interest corresponding to each target to-be-processed window other than the target circular region of interest.

14. A three-dimensional reconstruction apparatus, comprising:

a sliding calculation module for performing sliding calculation on an acquired current image frame according to a preset window size to obtain to-be-processed windows;

a feature extraction module for performing point feature extraction and line feature extraction on the to-be-processed windows, and determining corresponding features in each to-be-processed window;

an iterative splitting module for performing iterative quadtree splitting for circles on each target to-be-processed window to obtain circular regions of interest corresponding to each target to-be-processed window;

a feature screening module for performing feature screening on features in the target circular regions of interest to obtain target features corresponding to each target circular region of interest; and a three-dimensional reconstruction module for performing three-dimensional reconstruction corresponding to the current image frame by using the target features.

\* \* \* \* \*